US012776103B2

(12) United States Patent
Xie

(10) Patent No.: US 12,776,103 B2
(45) Date of Patent: Oct. 27, 2026

(54) METHOD, DEVICE AND STORAGE MEDIUM FOR CONSTRUCTING SCENE SPACE MODEL

(71) Applicant: REALSEE (BEIJING) TECHNOLOGY CO., LTD., Beijing (CN)

(72) Inventor: Zhe Xie, Beijing (CN)

(73) Assignee: REALSEE (BEIJING) TECHNOLOGY CO., LTD., Beijing (CN)

( * ) Notice: Subject to any disclaimer, the term of this patent is extended or adjusted under 35 U.S.C. 154(b) by 180 days.

(21) Appl. No.: 18/728,351

(22) PCT Filed: Jan. 5, 2023

(86) PCT No.: PCT/CN2023/070771

§ 371 (c)(1),
(2) Date: Jul. 11, 2024

(87) PCT Pub. No.: WO2023/134546

PCT Pub. Date: Jul. 20, 2023

(65) Prior Publication Data

US 2025/0095296 A1 Mar. 20, 2025

(30) Foreign Application Priority Data

Jan. 12, 2022 (CN) ........................ 202210033988.6

(51) Int. Cl.

| | |
|---|---|
| ***G06T 17/20*** | (2006.01) |
| ***G06T 3/08*** | (2024.01) |
| ***G06T 3/60*** | (2006.01) |
| ***G06T 7/90*** | (2017.01) |
| ***G06T 15/04*** | (2011.01) |

(52) U.S. Cl.
CPC ................ *G06T 17/20* (2013.01); *G06T 3/08* (2024.01); *G06T 3/60* (2013.01); *G06T 7/90* (2017.01);

(Continued)

(58) Field of Classification Search
CPC .. G06T 17/20; G06T 3/08; G06T 3/60; G06T 7/90; G06T 15/04; G06T 2200/08;

(Continued)

(56) References Cited

U.S. PATENT DOCUMENTS

2014/0085295 A1* 3/2014 Li ........................... G06T 17/00 345/419
2014/0301633 A1 10/2014 Furukawa et al.

(Continued)

FOREIGN PATENT DOCUMENTS

CN 106251399 A 12/2016
CN 112308778 A 2/2021

(Continued)

OTHER PUBLICATIONS

Zeng, F., & Zhong, R. (2014). The algorithm to generate color point-cloud with the registration between panoramic image and laser point-cloud. IOP Conference Series: Earth and Environmental Science, 17, 012160. https://doi.org/10.1088/1755-1315/17/1/012160 (Year: 2014).*

(Continued)

*Primary Examiner* — Kee M Tung
*Assistant Examiner* — Nauman U Ahmad
(74) *Attorney, Agent, or Firm* — BROOKS KUSHMAN P.C.

(57) ABSTRACT

According to the present disclosure, a method, device for constructing a scene space model and a storage medium are provided. The method includes: acquiring first point cloud information collected by mobile point cloud collection equipment; acquiring depth image information collected by fixed-point depth camera equipment; determining a rotation matrix of a camera coordinate system of the fixed-point depth camera equipment corresponding to a global coordinate system; generating a first panoramic image based on the (Continued)

depth image information, mapping the first panoramic image onto a three-dimensional unit sphere; rotating the three-dimensional unit sphere based on the rotation matrix to generate a second panoramic image; and generating a scene space model based on the first point cloud information and the second panoramic image.

11 Claims, 4 Drawing Sheets

(52) U.S. Cl.
CPC .......... *G06T 15/04* (2013.01); *G06T 2200/08* (2013.01); *G06T 2207/10028* (2013.01)

(58) Field of Classification Search
CPC . G06T 2207/10028; G06T 2207/10024; G06T 17/00; G06T 2210/04
See application file for complete search history.

(56) References Cited

U.S. PATENT DOCUMENTS

2016/0350618 A1* 12/2016 Meekins .................. G06T 7/55
2020/0150275 A1* 5/2020 Zhu .......................... G06T 7/10
2021/0223048 A1* 7/2021 Huang .................... G01S 17/42
2021/0327119 A1 10/2021 Malin et al.
2022/0410391 A1* 12/2022 Aparicio Ojea ....... B25J 9/1612
2023/0103385 A1* 4/2023 Zhang .................. G06T 3/4038 382/100
2024/0040101 A1* 2/2024 Adam .................. H04N 19/176

FOREIGN PATENT DOCUMENTS

CN 113570721 A 10/2021
CN 114399597 A 4/2022

OTHER PUBLICATIONS

International Search Report of PCT/CN2023/070771 mailed Mar. 23, 2023, 6 pages.
Written Opinion of PCT/CN2023/070771 dated Mar. 21, 2023, 3 pages.
Hoang Long et al., A 3D Shape Recognition Method Using Hybrid Deep Learning Network CNN-SVM, Electronics 2020, 9, 649, Dec. 31, 2020, http://dx.doi.org/10.3390/electronics9040649, 14 pages.
Hu et al., Research on BIM Modeling Method of Ancient Building Based on 3D Laser Point Cloud, Urban Geotechnical Investigation & Surveying, vol. 3, Jun. 30, 2020, pp. 98-102, with English Abstract.

* cited by examiner

METHOD, DEVICE AND STORAGE MEDIUM FOR CONSTRUCTING SCENE SPACE MODEL

This application is the U.S. national phase of PCT Application No. PCT/CN2023/070771 filed on Jan. 5, 2023, which claims priority to Chinese Patent Application No. CN202210033988.6, filed on Jan. 12, 2022, entitled "SCENE SPACE MODEL CONSTRUCTION METHOD AND APPARATUS, AND STORAGE MEDIUM", the disclosures of which are hereby incorporated in their entirety by reference herein.

FIELD

The present disclosure relates to the field of computer technology, and in particular, to a method, device and storage medium for constructing a scene space model.

BACKGROUND

In the existing indoor 3D reconstruction technology, laser scanning equipment or depth camera equipment is usually set up indoors, and by a manner of fixed-point shooting and collection, color data and depth data through the laser scanning equipment or depth camera equipment is collected, and by a manner of splicing point clouds at different points, a 3D model of the indoor scene and the corresponding panoramic image of each 3D model are generated.

SUMMARY

According to the present disclosure, a method, device, electronic device, and storage medium for constructing a scene space model are provided.

According to a first aspect of an embodiment of the present disclosure, a method for constructing a scene space model is provided, including: acquiring first point cloud information corresponding to a target scene collected by mobile point cloud collection equipment; acquiring depth image information corresponding to a partial region of the target scene collected by fixed-point depth camera equipment, where the depth image information includes: second point cloud information and image color information corresponding to the second point cloud information; determining a rotation matrix of a camera coordinate system of the fixed-point depth camera equipment corresponding to a global coordinate system based on the first point cloud information and the second point cloud information, where the global coordinate system is a coordinate system corresponding to the first point cloud information; generating a first panoramic image based on the depth image information, mapping the first panoramic image onto a three-dimensional unit sphere; rotating the three-dimensional unit sphere based on the rotation matrix to generate a second panoramic image; and generating a scene space model based on the first point cloud information and the second panoramic image.

Optionally, the determining the rotation matrix corresponding to the camera coordinate system of the fixed-point depth camera equipment and the global coordinate system based on the first point cloud information and the second point cloud information includes: splicing the second point cloud information collected by at least one fixed-point depth camera equipment to generate third point cloud information corresponding to a panoramic view of the target scene; determining a fixed-point rotation matrix of a camera coordinate system of the fixed-point depth camera equipment corresponding to the third point cloud information; determining a second fixed-point rotation matrix between the first point cloud information and the second point cloud information; and determining the rotation matrix based on the first fixed-point rotation matrix and the second fixed-point rotation matrix.

Optionally, the determining the second fixed-point rotation matrix between the first point cloud information and the second point cloud information includes: matching the first point cloud information and the second point cloud information based on a preset point cloud matching algorithm to acquire a second fixed-point rotation matrix between the first point cloud information and the second point cloud information, where the point cloud matching algorithm includes: iterative closest points (ICP) algorithm.

Optionally, the determining the rotation matrix based on the first fixed-point rotation matrix and the second fixed-point rotation matrix includes: serving the product of the first fixed-point rotation matrix and the second fixed-point rotation matrix as the third fixed-point rotation matrix corresponding to the fixed-point depth camera equipment; and calculating the rotation matrix by using the point cloud matching algorithm and taking the third fixed-point rotation matrix as an initial value, where the point cloud matching algorithms include: ICP algorithm.

Optionally, the mapping the first panoramic image onto a three-dimensional unit sphere includes: converting at least one pixel in the first panoramic image from two-dimensional coordinates to three-dimensional coordinates to map the first panoramic image to a three-dimensional unit sphere.

Optionally, the rotating the three-dimensional unit sphere based on the rotation matrix to generate a second panoramic image includes: rotating the three-dimensional unit sphere based on the rotation matrix to acquire new three-dimensional coordinates of at least one pixel of the first panoramic image; and generating a second panoramic image based on the new three-dimensional coordinates and the color information of at least one pixel.

Optionally, the generating a second panoramic image based on the new three-dimensional coordinates and the color information of at least one pixel includes: determining a new position of at least one pixel of the first panoramic image on the three-dimensional unit sphere based on the new three-dimensional coordinates; and adding color information of at least one pixel of the first panoramic image to the new position to generate the second panoramic image.

Optionally, the generating the scene space model based on the first point cloud information and the second panoramic image includes: performing surface reconstruction processing on the first point cloud information based on a surface reconstruction algorithm to generate a mesh model corresponding to the first point cloud information; generating a texture of the mesh based on position information of the mesh of the mesh model and the second panoramic image; and setting the texture at corresponding mesh to generate a three-dimensional space model.

Optionally, the surface reconstruction algorithm includes: Poisson surface reconstruction algorithm; the mesh includes: a triangular mesh and a quadrilateral mesh.

According to a second aspect of the embodiment of the present disclosure, a device for constructing a scene space model is provided, including: a first information acquiring module, configured to acquire first point cloud information corresponding to a target scene collected by mobile point cloud collection equipment; a second acquiring module, configured to acquire depth image information corresponding to a partial region of the target scene collected by fixed-point depth camera equipment, where the depth image information includes: second point cloud information and image color information corresponding to the second point cloud information; a rotation-matrix determining module, configured to determine a rotation matrix of a camera coordinate system of the fixed-point depth camera equipment corresponding to a global coordinate system based on the first point cloud information and the second point cloud information, where the global coordinate system is a coordinate system corresponding to the first point cloud information; a panoramic-image mapping module, configured to generate a first panoramic image based on the depth image information, map the first panoramic image onto a three-dimensional unit sphere; a panoramic-image converting module, configured to rotate the three-dimensional unit sphere based on the rotation matrix to generate a second panoramic image; and a scene-model generating module, configured to generate a scene space model based on the first point cloud information and the second panoramic image.

Optionally, the rotation-matrix determining module is configured to splice the second point cloud information collected by at least one fixed-point depth camera equipment to generate third point cloud information corresponding to a panoramic view of the target scene; and determine a fixed-point rotation matrix of a camera coordinate system of the fixed-point depth camera equipment corresponding to the third point cloud information; determine a second fixed-point rotation matrix between the first point cloud information and the second point cloud information; and determine the rotation matrix based on the first fixed-point rotation matrix and the second fixed-point rotation matrix.

Optionally, the rotation-matrix determining module is further configured to match the first point cloud information and the second point cloud information based on a preset point cloud matching algorithm to acquire a second fixed-point rotation matrix between the first point cloud information and the second point cloud information, where the point cloud matching algorithm includes: ICP algorithm.

Optionally, the rotation-matrix determining module is further configured to serve the product of the first fixed-point rotation matrix and the second fixed-point rotation matrix as the third fixed-point rotation matrix corresponding to the fixed-point depth camera equipment; and calculate the rotation matrix by using the point cloud matching algorithm and taking the third fixed-point rotation matrix as an initial value, where the point cloud matching algorithms include: ICP algorithm.

Optionally, the panoramic-image mapping module is further configured to convert at least one pixel in the first panoramic image from two-dimensional coordinates to three-dimensional coordinates to map the first panoramic image to a three-dimensional unit sphere.

Optionally, the panoramic-image converting module is further configured to rotate the three-dimensional unit sphere based on the rotation matrix to acquire new three-dimensional coordinates of at least one pixel of the first panoramic image; and generate a second panoramic image based on the new three-dimensional coordinates and the color information of at least one pixel.

Optionally, the panoramic-image converting module is further configured to determine a new position of at least one pixel of the first panoramic image on the three-dimensional unit sphere based on the new three-dimensional coordinates; and add color information of at least one pixel of the first panoramic image to the new position to generate the second panoramic image.

Optionally, the scene-model generating module is further configured to perform surface reconstruction processing on the first point cloud information based on a surface reconstruction algorithm to generate a mesh model corresponding to the first point cloud information; generate a texture of the mesh based on position information of the mesh of the mesh model and the second panoramic image; and set the texture at corresponding mesh to generate a three-dimensional space model.

Optionally, the surface reconstruction algorithm includes: Poisson surface reconstruction algorithm; the mesh includes: a triangular mesh and a quadrilateral mesh.

According to a third aspect of an embodiment of the present disclosure, an electronic device is provided. The electronic device includes:

a memory for storing a computer program product;

a processor for executing a computer program product stored in the memory, where the computer program product, when executed, perform a method for constructing a scene space model as described in any embodiment.

According to a fourth aspect of an embodiment of the present disclosure, a computer-readable storage medium is provided, on which computer program instructions are stored, where the computer program instructions, when executed by a processor, perform a method for constructing a scene space model as described in any of the above embodiments.

According to a fifth aspect of an embodiment of the present disclosure, a computer program product is provided, including computer program instructions, where the computer program instructions, when executed by a processor, perform a method for constructing a scene space model in any of the embodiments.

Based on the method, device, electronic device, and storage medium for constructing the scene space model according to the above embodiments of the present disclosure, it is possible to integrate the characteristics of fixed-point depth camera equipment and mobile point cloud collection equipment to generate a scene space model. The present disclosure can reduce the splicing errors at different points and effectively solve the problem that the existing method for constructing the scene space model is easy to introduce cumulative errors, resulting in serious distortion of the scene space model; The present disclosure can improve shooting efficiency, reduce the requirements for shooting equipment, and improve the modeling efficiency and accuracy of the scene space model. The present disclosure can provide the user with a better VR display experience and improve customer experience.

The technical solution of the present disclosure will be described in further detail below through the accompanying drawings and examples.

BRIEF DESCRIPTION OF THE DRAWINGS

The accompanying drawings, which constitute a part of the description, illustrate embodiments of the present disclosure and, together with the description, is used to explain principles of the present disclosure.

The present disclosure may be more clearly understood from the following detailed description with reference to the accompanying drawings.

DESCRIPTION OF THE PREFERRED EMBODIMENTS

Figure 1:
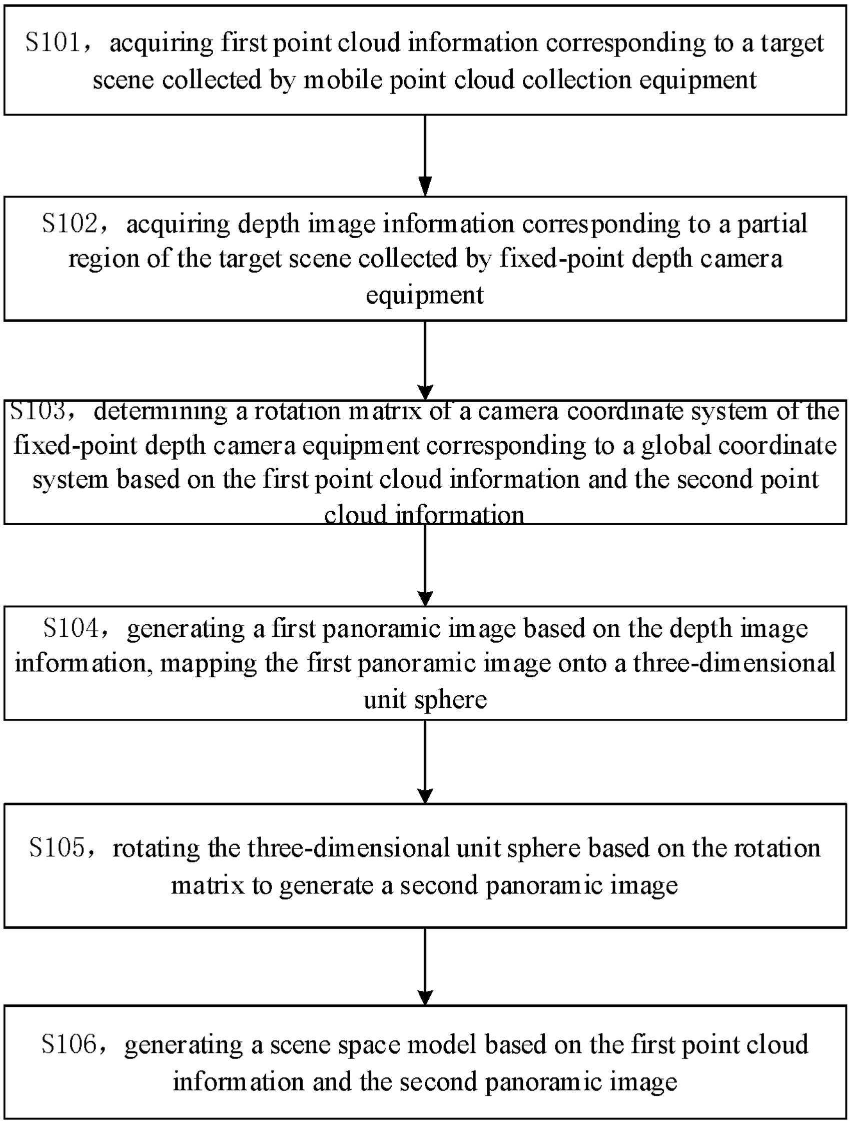
FIG. 1 is a flowchart of a method for constructing a scene space model according to an embodiment of the present disclosure.

Various exemplary embodiments of the present disclosure will be described in detail with reference to the accompanying drawings. It should be noted that the relative arrangement of components and steps, numerical expressions, and numerical values set forth in these embodiments do not limit the scope of the disclosure unless otherwise specifically stated.

At the same time, it should be understood that, for convenience of description, the dimensions of various parts shown in the drawings are not drawn based on actual proportional relationships.

The following description of at least one exemplary embodiment is merely illustrative in nature and is in no way intended to limit the disclosure, its application or uses.

Techniques, methods and devices known to those skilled in the art may not be discussed in detail, but where appropriate, such techniques, methods and devices should be considered a part of this description.

It should be noted that similar reference numerals and letters refer to similar items in the following figures, so that once an item is defined in one figure, it does not require further discussion in subsequent figures.

Embodiments of the present disclosure may be applied to computer systems/servers, which may operate with numerous other general purpose or special purpose computing system environments or configurations. Examples of well-known computing systems, environments and/or configurations suitable for use with electronic devices such as computer systems/servers include, but are not limited to: personal computer systems, server computer systems, thin clients, thick clients, handheld or laptop devices, microprocessor-based systems, set-top boxes, programmable consumer electronics, networked personal computers, small computer systems, mainframe computer systems, and distributed cloud computing technology environments including any of the above systems, etc.

Computer systems/servers may be described in the general context of computer system executable instructions (such as program modules) being executed by the computer system. Generally, program modules may include routines, programs, object programs, components, logic, data structures, etc., that perform specific tasks or implement specific abstract data types. The computer system/server may be implemented in a distributed cloud computing environment. In the distributed cloud computing environment, tasks are performed by remote processing devices linked through a communications network. In a distributed cloud computing environment, program modules may be stored on local or remote computing system storage media including storage devices.

Application Overview

In the process of realizing the present disclosure, the inventors found that for scenes with large site areas, cumulative errors are easily introduced when a scene space model is established, causing serious distortions of the scene space model to be spliced together from point clouds collected at different points, therefore, a new scene space model construction scheme is needed.

The scene space model construction method according to the present disclosure acquires first point cloud information corresponding to a target scene collected by mobile point cloud collection equipment; acquires depth image information corresponding to a partial region of the target scene collected by fixed-point depth camera equipment; based on the first point cloud information and the second point cloud information, determines a rotation matrix of a camera coordinate system of the fixed-point depth camera equipment corresponding to a global coordinate system; based on the depth image information, generates a first panoramic image, maps the first panoramic image onto a three-dimensional unit sphere; based on the rotation matrix, rotates the three-dimensional unit sphere to generate a second panoramic image; and based on the first point cloud information and the second panoramic image, generates a scene space model. The present disclosure can effectively reduce the distortion phenomenon in the scene space model, improve shooting efficiency, reduce the requirements for shooting equipment, and improve the modeling efficiency and accuracy of the scene space model. The present disclosure can present users with a better VR display experience and improve customer usage.

Exemplary Methods

The step numbers in the present disclosure, such as "Step 1", "Step 2", "S101", "S102", etc., are only for distinguishing different steps and do not represent the order between steps. Steps with different numbers are executed when the order may be adjusted.

FIG. 1 is a flowchart of a method for constructing a scene space model according to an embodiment of the present disclosure. The method shown in FIG. 1 includes steps: S101-S106.

S101, acquiring first point cloud information corresponding to a target scene collected by mobile point cloud collection equipment.

In an embodiment, the target scene may be a large-scale scene, such as a stadium, a museum, etc. Mobile point cloud collection equipment may be of various types, such as handheld laser scanners, etc. Mobile point cloud collection equipment may collect three-dimensional point cloud information.

In target scenes such as stadiums and museums, the user holds a mobile point cloud collection equipment and walks in the target scene at a normal walking speed. The mobile point cloud collection equipment collects panoramic point cloud information in the target scene, that is, the first point cloud information. The information collected through mobile point cloud collection equipment lacks high-definition color data and cannot provide high-resolution color photos.

S102, acquiring depth image information corresponding to a partial region of the target scene collected by fixed-point depth camera equipment.

The depth image information includes: second point cloud information and image color information corresponding to the second point cloud information.

In an optional embodiment, there may be multiple types of fixed-point depth camera equipment, such as depth cameras. At least one shooting point is set up in target scenes such as stadiums and museums, and depth camera equipment is installed at at least one shooting point as fixed-point depth camera equipment. Depth image information in the target area is collected through at least one fixed-point depth camera equipment, including second point cloud information and image color information. Fixed-point depth camera equipment may collect high-definition color data and provide high-resolution color photos.

S103, determining a rotation matrix of a camera coordinate system of the fixed-point depth camera equipment corresponding to a global coordinate system based on the first point cloud information and the second point cloud information.

The global coordinate system is a coordinate system corresponding to the first point cloud information. The camera coordinate system of the fixed-point depth camera equipment is the coordinate system corresponding to the point cloud data collected by the fixed-point depth camera equipment.

In an optional embodiment, the first point cloud information is panoramic point cloud information corresponding to the panorama of the target scene, and the second point cloud information is point cloud information of a part region of the target scene. The coordinate system corresponding to the first point cloud information is set as the global coordinate system, and by determining the rotation matrix of the fixed-point depth camera equipment in the global coordinate system, orientation information in the panoramic model generated by the fixed-point depth camera equipment through the first point cloud information can be acquired.

S104, generating a first panoramic image based on the depth image information, mapping the first panoramic image onto a three-dimensional unit sphere.

In an embodiment, various existing methods may be used to splice the depth image information collected by each fixed-point depth camera equipment into a first panoramic image, and map the first panoramic image onto a three-dimensional unit sphere.

S105, rotating the three-dimensional unit sphere based on the rotation matrix to generate a second panoramic image.

S106, generating a scene space model based on the first point cloud information and the second panoramic image.

In an embodiment, the first point cloud information is used to generate a global space mode and acquire the image color information in the depth image information. By matching the second point cloud information with the first point cloud information, the three-dimensional position information of the fixed-point depth camera equipment in the panorama is acquired to map the image color information to the corresponding position in the global model to generate a scene space model.

The method for constructing a scene space model according to the above embodiment can integrate the characteristics of fixed-point depth camera equipment and mobile point cloud collection equipment to generate a scene space model, which can provide users with a better VR display experience.

Figure 2:
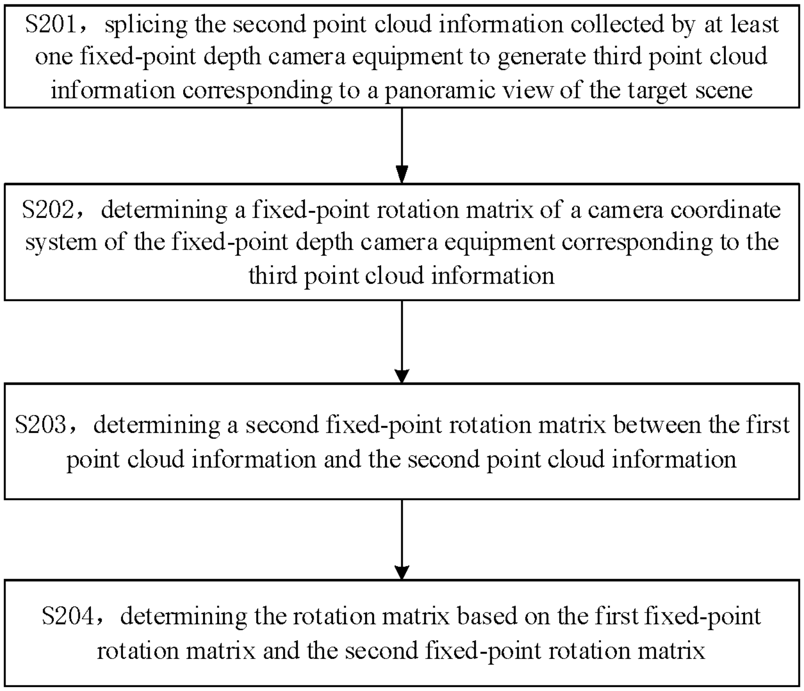
FIG. 2 is a flowchart of determining a rotation matrix of a method for constructing a scene space model according to an embodiment of the present disclosure.

FIG. 2 is a flowchart of determining a rotation matrix of a method for constructing a scene space model according to an embodiment of the present disclosure. The method shown in FIG. 2 includes steps: S201-S204.

S201, splicing the second point cloud information collected by at least one fixed-point depth camera equipment to generate third point cloud information corresponding to a panoramic view of the target scene.

In an embodiment, various existing splicing methods may be used, such as the existing Iterative Closest Points (ICP) algorithm, etc., to splice at least a part of (for example, all) the second point cloud information (regional point cloud information) to generate third point cloud information (panoramic point cloud information) corresponding to the panoramic view of the target scene.

S202, determining a fixed-point rotation matrix of a camera coordinate system of the fixed-point depth camera equipment corresponding to the third point cloud information.

In an embodiment, when splicing is performed through the ICP algorithm, the first fixed-point rotation matrix corresponding to the fixed-point depth camera equipment and the third point cloud information may be determined.

S203, determining a second fixed-point rotation matrix between the first point cloud information and the second point cloud information.

In an embodiment, manual positioning or point cloud feature extraction is used, or a point cloud matching algorithm is used to match the first point cloud information and the third point cloud information to acquire the second fixed-point rotation matrix between the first point cloud information and the second point cloud information. The point cloud matching algorithm includes but is not limited to ICP algorithm, etc.

S204, determining the rotation matrix based on the first fixed-point rotation matrix and the second fixed-point rotation matrix.

Figure 3:
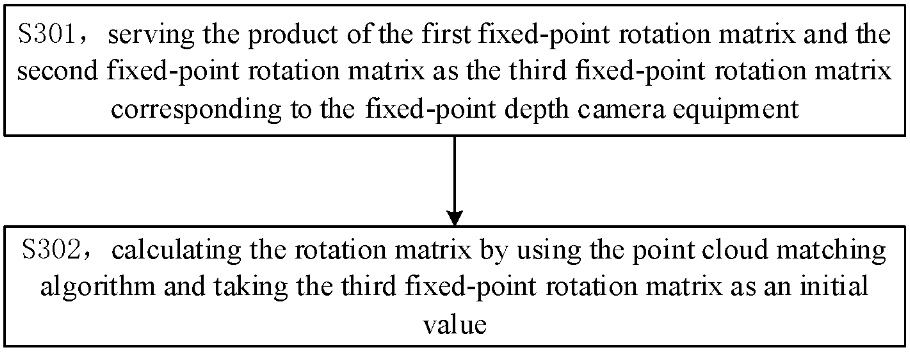
FIG. 3 is a flowchart of determining a rotation matrix based on a first fixed-point rotation matrix and a second fixed-point rotation matrix of a method for constructing a scene space model according to another embodiment of the present disclosure.

FIG. 3 is a flowchart of determining a rotation matrix based on a first fixed-point rotation matrix and a second fixed-point rotation matrix of a method for constructing a scene space model according to another embodiment of the present disclosure. The method shown in FIG. 3 includes the steps: S301-S302.

S301, serving the product of the first fixed-point rotation matrix and the second fixed-point rotation matrix as the third fixed-point rotation matrix corresponding to the fixed-point depth camera equipment.

S302, calculating the rotation matrix by using the point cloud matching algorithm and taking the third fixed-point rotation matrix as an initial value.

The point cloud matching algorithms include: ICP algorithm, etc.

In an embodiment, the user holds a mobile point cloud collection equipment and walks within the target scene at a normal walking speed, and uses the mobile point cloud collection equipment to collect the first point cloud information of the entire shooting scene (recorded as GlobalCloud). Fixed-point depth camera equipment at each one shooting point is used to collect depth image information of a part of the target scene, including second point cloud information (recorded as subLocalCloud) and image color information. Since the depth image data collected by the fixed-point depth camera equipment is not ultimately used to generate the scene space model, multiple persons may use the fixed-point depth camera equipment to shoot in parallel, which can improve the shooting efficiency, and the area shot by each person does not exceed a certain threshold, thereby effectively avoiding splicing errors at different points during the shooting process.

The coordinate system corresponding to GlobalCloud is the global coordinate system. Each LocalCloud is positioned within the rotation matrix of the GlobalCloud, which includes splicing the subLocalCloud (second point cloud information) taken at each shooting point to generate a LocalCloud, and acquire the rotation matrix M0 (the first fixed-point rotation matrix) of the subLocalCloud collected at a separate shooting point relative to the LocalCloud.

Using manual positioning or point cloud feature extraction and ICP algorithm, a rotation matrix M1 (second fixed-point rotation matrix) of LocalCloud for GlobalCloud is acquired. The rotation matrix M3 (third fixed-point rotation matrix)=M1*M0 of the fixed-point depth camera equipment at each individual shooting point relative to the global coordinate system is acquired.

The rotation matrix M3 is used as the initial value of the point cloud configuration algorithm, for example, as the initial value of the ICP algorithm, etc., the rotation matrix M4 of the fixed-point depth camera equipment at each shooting point in the GlobalCloud is calculated. Based on the rotation matrix M4, the rotation matrix of each LocalCloud within the GlobalCloud may be determined.

For example, the rotation matrix M4 is as follows.

$$\begin{bmatrix} R11 & R12 & R13 & T1 \\ R21 & R22 & R23 & T2 \\ R31 & R32 & R33 & T3 \\ 0 & 0 & 0 & 1 \end{bmatrix}$$

The matrix R (rotation matrix) is:

$$\begin{bmatrix} R11 & R12 & R13 \\ R21 & R22 & R23 \\ R31 & R32 & R33 \end{bmatrix}$$

The T vector is: [T1 T2 T3].

Figure 4:
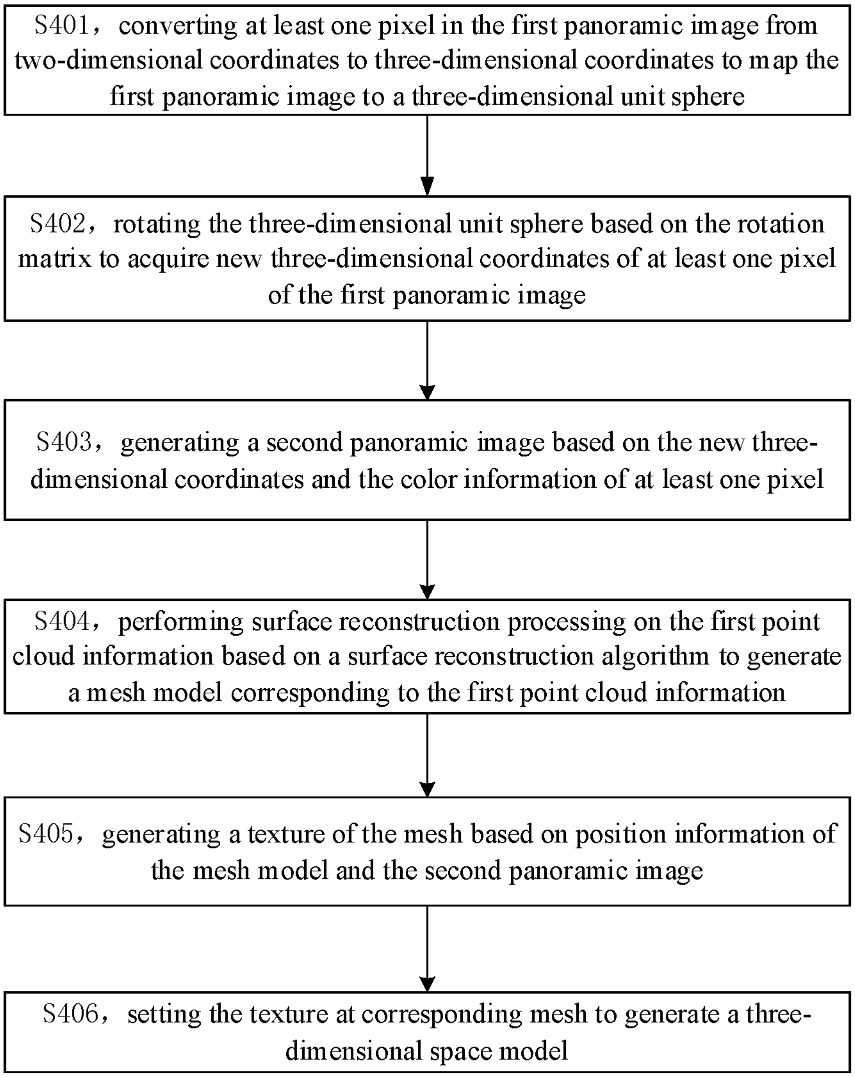
FIG. 4 is a flowchart of generating a scene space model of a method for constructing a scene space model according to an embodiment of the present disclosure.

FIG. 4 is a flowchart of generating a scene space model of a method for constructing a scene space model according to an embodiment of the present disclosure. The method shown in FIG. 4 includes steps: S401-S406.

S401, converting at least one pixel in the first panoramic image from two-dimensional coordinates to three-dimensional coordinates to map the first panoramic image to a three-dimensional unit sphere.

S402, rotating the three-dimensional unit sphere based on the rotation matrix to acquire new three-dimensional coordinates of at least one pixel of the first panoramic image.

S403, generating a second panoramic image based on the new three-dimensional coordinates and the color information of at least one pixel.

In some optional embodiments, the method includes: determining a new position of at least one pixel of the first panoramic image on the three-dimensional unit sphere based on the new three-dimensional coordinates; and adding color information of at least one pixel of the first panoramic image to the new position to generate the second panoramic image.

S404, performing surface reconstruction processing on the first point cloud information based on a surface reconstruction algorithm to generate a mesh model corresponding to the first point cloud information.

The mesh model may be a polygonal mesh model, such as a triangular mesh model, a quadrilateral mesh model, etc.

S405, generating a texture of the mesh based on position information of the mesh model and the second panoramic image.

S406, setting the texture at corresponding mesh to generate a three-dimensional space model. The surface reconstruction algorithm includes but is not limited to: Poisson surface reconstruction algorithm; the mesh includes but is not limited to: a triangular mesh and a quadrilateral mesh, etc.

In an embodiment, by acquiring the rotation matrix M4, the position of the fixed-point depth camera equipment in GlobalCloud and the orientation of the camera can be determined, where the R matrix (rotation matrix) is the camera orientation, and the three components of T are three-dimensional position x, y, z of subLocalCloud (Fixed-point depth camera equipment) in GlobalCloud.

the generating a first panoramic image based on the depth image information collected by at least one fixed-point depth camera equipment, and rotating the first panoramic image includes: projecting the first panoramic image onto the unit sphere, using the matrix R to rotate the unit sphere, and then re-projecting it onto the panorama, and acquiring the perspective of the panorama in global mode, that is, acquiring the second panoramic image. The three-dimensional coordinates point3 on the unit sphere of each pixel of the first panoramic image may be acquired through various methods. For example, the relevant code is as follows:

```
//2d -> 3d
void Pano2Cloud(int x_, int y_, PointTa point3, int rows, int cols)
{
float X, y, z;
double phi, theta;
phi=(MLPI * y_)/ rows;
phi -=(M_PI / 2);
y= sin(phi);
theta-(2 * M_PI * x )/ cols;
if (theta >= 1.5 * M_PI) {
x= sin(theta)* cos(phi);
z=-Sqrt(1 -×*×-y * y);
}
if (theta >= M_PI * 0.5 && theta <= 1.5 * M_PI){
theta -= M_PI;
× = sin(theta)* cos(phi);//
z=sgrt( 1-x*×-Y * y);
} else {
theta=-theta;
× = sin(theta)* cos(phi);
z=-sqrt(1-×*x-y * y);
}
point3.x = x;
point3.y=y;
point3.z = z;
}
```

The rotation matrix R is used to acquire the new coordinates R*point3 of at least one pixel of the first panoramic image after rotation. The inverse operation of projecting the first panoramic image to the unit sphere is used to acquire the position of at least one pixel (for example, each pixel) of the first panoramic image in the new panorama, and then at least one pixel of the first panoramic image is converted into the color RGB information of the original position to the new position, that is, a new second panoramic image is acquired.

The Poisson surface reconstruction algorithm is used to generate the mesh model mesh of the GlobalCloud point cloud. Combined with the second panoramic image, the textures of each mesh mesh in the mesh model mesh are generated to complete the model reconstruction of the scene and generate the scene space model.

The method for constructing a scene space model according to the above embodiment can effectively reduce the distortion phenomenon in the scene space model, improve shooting efficiency, reduce the requirements for shooting equipment, and improve the modeling efficiency and accuracy of the scene space model. The method can present to the user with better VR display experience and improved customer experience.

Those skilled in this art may understand that all or part of the steps to implement the above method embodiments may be completed through hardware related to program instructions. The aforementioned program may be stored in a computer readable storage medium, and the program, when executed, performs the steps including the above method embodiments; the aforementioned storage media include various media that may store program code, such as ROM, RAM, disks, or CDs.

Exemplary Devices

Figure 5:
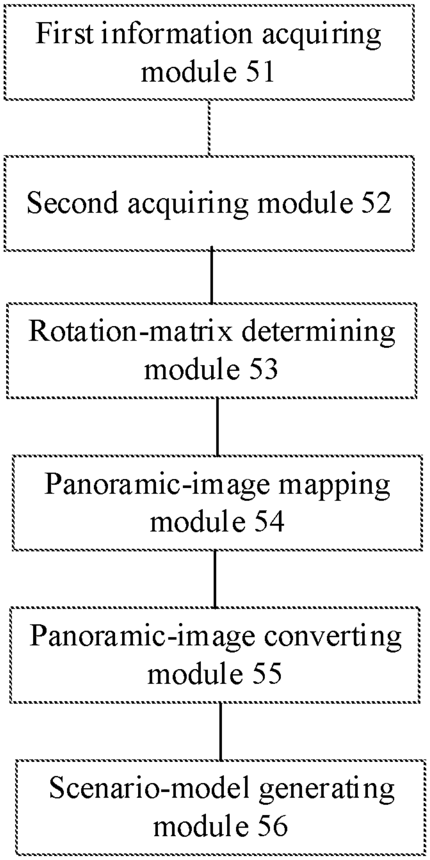
FIG. 5 is a schematic structure diagram of a device for constructing a scene space model according to an embodiment of the present disclosure.

FIG. 5 is a schematic structure diagram according to an embodiment of the present disclosure. The device according to the present disclosure may be used to implement at least one method embodiment disclosed herein. As shown in FIG. 5, according to the present disclosure, a device for constructing a scene space model is provided, including: a first information acquiring module 51, a second acquiring module 52, a rotation-matrix determining module 53, and a panoramic-image mapping module 54, a panoramic-image converting module 55 and a scene-model generating module 56.

The first information acquiring module 51 acquires first point cloud information corresponding to a target scene collected by mobile point cloud collection equipment. The second acquiring module 52 acquires depth image information corresponding to a partial region of the target scene collected by fixed-point depth camera equipment. The depth image information includes: second point cloud information and image color information corresponding to the second point cloud information.

The rotation-matrix determining module 53 based on the first point cloud information and the second point cloud information, determines a rotation matrix of a camera coordinate system of the fixed-point depth camera equipment corresponding to a global coordinate system. The global coordinate system is a coordinate system corresponding to the first point cloud information. The panoramic-image mapping module 54 based on the depth image information, generates a first panoramic image, map the first panoramic image onto a three-dimensional unit sphere. The panoramic-image converting module 55 based on the rotation matrix, rotates the three-dimensional unit sphere to generate a second panoramic image. The scene-model generating module 56 based on the first point cloud information and the second panoramic image, generates a scene space model.

In an embodiment, the rotation-matrix determining module 53 splices the second point cloud information collected by at least one fixed-point depth camera equipment to generate third point cloud information corresponding to a panoramic view of the target scene. The rotation-matrix determining module 53 determines a fixed-point rotation matrix of a camera coordinate system of the fixed-point depth camera equipment corresponding to the third point cloud information. The rotation-matrix determining module 53 determines a second fixed-point rotation matrix between the first point cloud information and the second point cloud information; and determine the rotation matrix based on the first fixed-point rotation matrix and the second fixed-point rotation matrix.

For example, the rotation-matrix determining module 53 matches the first point cloud information and the second point cloud information based on a preset point cloud matching algorithm to acquire a second fixed-point rotation matrix between the first point cloud information and the second point cloud information. The point cloud matching algorithm includes but is not limited to: ICP algorithm, etc.

The rotation-matrix determining module 53 serves the product of the first fixed-point rotation matrix and the second fixed-point rotation matrix as the third fixed-point rotation matrix corresponding to the fixed-point depth camera equipment. The rotation-matrix determining module 53 calculates the rotation matrix by using the point cloud matching algorithm and taking the third fixed-point rotation matrix as an initial value.

In some optional embodiments, the panoramic-image mapping module 54 converts at least one pixel in the first panoramic image from two-dimensional coordinates to three-dimensional coordinates to map the first panoramic image to a three-dimensional unit sphere. The panoramic-image converting module 55 based on the rotation matrix, rotates the three-dimensional unit sphere to acquire new three-dimensional coordinates of at least one pixel of the first panoramic image The panoramic-image converting module 55 based on the new three-dimensional coordinates and the color information of at least one pixel, generates a second panoramic image.

For example, the panoramic-image converting module 55 based on the new three-dimensional coordinates, determines a new position of at least one pixel of the first panoramic image on the three-dimensional unit sphere. The panoramic-image converting module 55 adds color information of at least one pixel of the first panoramic image to the new position to generate the second panoramic image.

The scene-model generating module 56 based on a surface reconstruction algorithm, performs surface reconstruction processing on the first point cloud information, and generates a mesh model corresponding to the first point cloud information. The scene-model generating module 56 based on position information of the mesh of the mesh model and the second panoramic image, generates a texture of the mesh; and sets the texture at corresponding mesh, and generates three-dimensional space model.

The service processing device according to the above embodiment effectively solves the problem that the existing method for constructing a scene space model is easy to introduce cumulative errors, resulting in serious distortion of the scene space model. The device can improve the shooting efficiency, reduce the requirements for shooting equipment, and improve the modeling efficiency and accuracy of the scene space model. The device can provide the user with a better VR display experience and improve customer experience.

Figure 6:
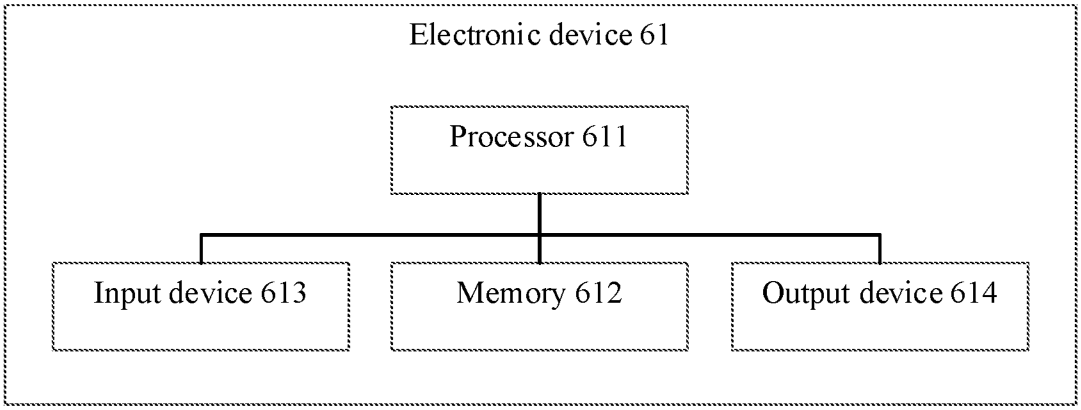
FIG. 6 is a structural diagram of an embodiment of an electronic device according to the present disclosure.

FIG. 6 is a structural diagram according to an embodiment of an electronic device of the present disclosure. As shown in FIG. 6, the electronic device 61 includes one or more processors 611 and a memory 612.

The processor 611 may be a central processing unit (CPU) or other form of processing unit with data processing capabilities and/or instruction execution capabilities, and may control other components in the electronic device 61 to perform desired functions.

The memory 612 may include one or more computer program products. The computer program products may include various forms of computer-readable storage media, such as volatile memory and/or non-volatile memory. Volatile memory, for example, may include: random access memory (RAM) and/or cache memory (cache), etc. Non-volatile memory, for example, may include: read-only memory (ROM), hard disk, flash memory, etc. One or more computer program instructions may be stored on a computer-readable storage medium, and the processor 611 may execute the program instructions to implement the above method for constructing a scene space model and/or other desired functions according to various embodiments of the present disclosure. Various contents such as input signals, signal components, noise components, etc. may also be stored in the computer-readable storage medium.

In one example, the electronic device 61 may also include an input device 613 and an output device 614, etc. These components are interconnected through a bus system and/or other forms of connection mechanisms (not shown). In addition, the input device 613 may further include, for example, a keyboard, a mouse, and the like. The output device 614 may output various information to the outside. The output device 614 may include, for example, a display, a speaker, a printer, a communication network and remote output devices connected thereto, and the like.

Of course, for simplicity, only some of the components in the electronic device 61 related to the present disclosure are shown in FIG. 6, and components such as buses, input/output interfaces, etc. are omitted. In addition, the electronic device 61 may further include any other appropriate components depending on the specific application.

In addition to the above methods and devices, embodiments of the present disclosure may also be a computer program product, which includes computer program instructions that, when executed by a processor, cause the processor to execute the steps in the method for constructing a scene space model according to various embodiments of the present described in the above-mentioned "exemplary method" in this description.

The computer program product may be written with program code for performing operations of embodiments of the present disclosure in any combination of one or more programming languages, including object-oriented programming languages such as Java, C++, etc., further includes conventional procedural programming languages, such as the "C" language or similar programming languages. The program code may execute entirely on a computing device of a user, partly on a device of a user, as a stand-alone software package, partly on the computing device of a user and partly on a remote computing device, or entirely on the remote computing device or server execute on.

In addition, embodiments of the present disclosure may also be a computer-readable storage medium having computer program instructions stored thereon. The computer program instructions, when executed by a processor, cause the processor to execute the steps in the method for constructing a scene space model according to various embodiments of the present disclosure described in the above-mentioned "example method" of this description.

The computer-readable storage medium may be any combination of one or more readable media. The readable medium may be a readable signal medium or a readable storage medium. The readable storage medium may include, for example, but is not limited to, electrical, magnetic, optical, electromagnetic, infrared, or semiconductor systems, devices or components, or any combination thereof. More specific examples (non-exhaustive list) of readable storage media include: electrical connection with one or more conductors, portable disk, hard disk, random access memory (RAM), read only memory (ROM), erasable programmable read-only memory (EPROM or flash memory), optical fiber, portable compact disk read-only memory (CD-ROM), optical storage device, magnetic storage device, or any suitable combination of the above.

The basic principles of the present disclosure have been described above in conjunction with specific embodiments. However, it should be pointed out that the advantages, strength, effects, etc. mentioned in the present disclosure are only examples and not limitations. These advantages, strength, effects, etc. cannot be considered to be each embodiment of the present disclosure must have. In addition, the specific details disclosed above are only for the purpose of illustration and to facilitate understanding, and are not limiting. The above details do not limit the present disclosure to be implemented by using the above specific details.

Based on the method, device for constructing the scene space model, the electronic device, and the storage medium according to the above embodiments of the present disclosure, it is possible to integrate the characteristics of fixed-point depth camera equipment and mobile point cloud collection equipment to generate a scene space model. The present disclosure can reduce the splicing errors at different points and effectively solve the problem that the existing method for constructing the scene space model is easy to introduce cumulative errors, resulting in serious distortion of the scene space model. The present disclosure can improve shooting efficiency, reduce the requirements for shooting equipment, and improve the modeling efficiency and accuracy of the scene space model. The present disclosure can provide the user with a better VR display experience and improve customer experience.

At least one embodiment in this description is described in a progressive manner, and each embodiment focuses on its differences from other embodiments. The same or similar parts between the various embodiments may be referred to each other. For the system embodiment, since it basically corresponds to the method embodiment, the description is relatively simple. For relevant details, reference is made to the partial description of the method embodiment.

There may be many ways to implement the methods and device disclosed herein. For example, the methods and device disclosed herein may be implemented through software, hardware, firmware, or any combination of software, hardware, and firmware. The above order of steps used for the method is for illustration only, and the steps of the disclosed method are not limited to the specific order described above, unless otherwise specified. In addition, in some embodiments, the present disclosure may also be implemented as programs recorded in a recording medium, including machine readable instructions for implementing methods according to the present disclosure. Therefore, the present disclosure also covers a recording medium for storing programs for executing methods according to the present disclosure.

The description of the present disclosure has been presented for the purposes of illustration and description, and is not intended to be exhaustive or to limit the present disclosure to the form disclosed. Many modifications and variations will be apparent to those skilled in the art. Choosing and describing the embodiment is to better explain the principles of the disclosure and the practical application, and enables those skilled in the art to understand the present disclosure and design various embodiments with various modifications as are suited to the particular use contemplated.

What is claimed is:

1. A method for constructing a scene space model, comprising:

acquiring first point cloud information corresponding to a target scene collected by mobile point cloud collection equipment;

acquiring depth image information corresponding to a partial region of the target scene collected by fixed-point depth camera equipment, wherein the depth image information includes: second point cloud information and image color information corresponding to the second point cloud information;

determining a rotation matrix of a camera coordinate system of the fixed-point depth camera equipment corresponding to a global coordinate system based on the first point cloud information and the second point cloud information, wherein the global coordinate system is a coordinate system corresponding to the first point cloud information;

generating a first panoramic image based on the depth image information, mapping the first panoramic image onto a three-dimensional unit sphere;

rotating the three-dimensional unit sphere based on the rotation matrix to generate a second panoramic image; and generating the scene space model based on the first point cloud information and the second panoramic image;

wherein the determining the rotation matrix corresponding to the camera coordinate system of the fixed-point depth camera equipment and the global coordinate system based on the first point cloud information and the second point cloud information includes:

splicing the second point cloud information collected by at least one fixed-point depth camera equipment to generate third point cloud information corresponding to a panoramic view of the target scene;

determining a first fixed-point rotation matrix of a camera coordinate system of the fixed-point depth camera equipment corresponding to the third point cloud information;

determining a second fixed-point rotation matrix between the first point cloud information and the second point cloud information; and determining the rotation matrix based on the first fixed-point rotation matrix and the second fixed-point rotation matrix;

wherein the determining the second fixed-point rotation matrix between the first point cloud information and the second point cloud information includes: matching the first point cloud information and the second point cloud information based on a preset point cloud matching algorithm to acquire the second fixed-point rotation matrix between the first point cloud information and the second point cloud information, wherein the preset point cloud matching algorithm includes: iterative closest points (ICP) algorithm;

wherein the determining the rotation matrix based on the first fixed-point rotation matrix and the second fixed-point rotation matrix includes: serving a product of the first fixed-point rotation matrix and the second fixed-point rotation matrix as a third fixed-point rotation matrix corresponding to the fixed-point depth camera equipment; and calculating the rotation matrix by using the preset point cloud matching algorithm and taking the third fixed-point rotation matrix as an initial value.

2. The method of claim 1, wherein the mapping the first panoramic image onto the three-dimensional unit sphere includes:

converting at least one pixel in the first panoramic image from two-dimensional coordinates to three-dimensional coordinates to map the first panoramic image to the three-dimensional unit sphere.

3. The method of claim 2, wherein the generating the scene space model based on the first point cloud information and the second panoramic image includes:

performing surface reconstruction processing on the first point cloud information based on a surface reconstruction algorithm to generate a mesh model corresponding to the first point cloud information;

generating a texture of a mesh of the mesh model based on position information of the mesh of the mesh model and the second panoramic image; and setting the texture at the mesh to generate a three-dimensional space model.

4. The method of claim 1, wherein the rotating the three-dimensional unit sphere based on the rotation matrix to generate the second panoramic image includes:

rotating the three-dimensional unit sphere based on the rotation matrix to acquire new three-dimensional coordinates of at least one pixel of the first panoramic image; and generating the second panoramic image based on the new three-dimensional coordinates and the color information of the at least one pixel.

5. The method of claim 4, wherein the generating the second panoramic image based on the new three-dimensional coordinates and the color information of the at least one pixel includes:

determining a new position of the at least one pixel of the first panoramic image on the three-dimensional unit sphere based on the new three-dimensional coordinates; and adding color information of the at least one pixel of the first panoramic image to the new position to generate the second panoramic image.

6. The method of claim 5, wherein the generating the scene space model based on the first point cloud information and the second panoramic image includes:

performing surface reconstruction processing on the first point cloud information based on a surface reconstruction algorithm to generate a mesh model corresponding to the first point cloud information;

generating a texture of a mesh of the mesh model based on position information of the mesh of the mesh model and the second panoramic image; and setting the texture at the mesh to generate a three-dimensional space model.

7. The method of claim 4, wherein the generating the scene space model based on the first point cloud information and the second panoramic image includes:

performing surface reconstruction processing on the first point cloud information based on a surface reconstruction algorithm to generate a mesh model corresponding to the first point cloud information;

generating a texture of a mesh of the mesh model based on position information of the mesh of the mesh model and the second panoramic image; and setting the texture at the mesh to generate a three-dimensional space model.

8. The method of claim 1, wherein the generating the scene space model based on the first point cloud information and the second panoramic image includes:

performing surface reconstruction processing on the first point cloud information based on a surface reconstruction algorithm to generate a mesh model corresponding to the first point cloud information;

generating a texture of a mesh of the mesh model based on position information of the mesh of the mesh model and the second panoramic image; and setting the texture at the mesh to generate a three-dimensional space model.

9. The method of claim 8, wherein the surface reconstruction algorithm includes: Poisson surface reconstruction algorithm; the mesh includes: a triangular mesh and a quadrilateral mesh.

10. A non-transitory computer-readable storage medium, on which computer program instructions are stored, wherein the computer program instructions, when executed by a processor, perform the method for constructing the scene space model of claim 1.

11. An electronic device, comprising:

a memory for storing a computer program product;

a processor for executing a computer program product stored in the memory, wherein the computer program product, when executed, performs the method for constructing the scene space model of claim 1.

* * * * *